US012779487B2

(12) United States Patent
Cao et al.

(10) Patent No.: US 12,779,487 B2
(45) Date of Patent: Nov. 3, 2026

(54) METHOD FOR PREVENTING SPRAY GUN FROM BLOCKING AND MULTI-COMPONENT SPRAY GUN FOR SPRAYING RAPID SOLIDIFICATION MATERIAL

(71) Applicant: Jinan Abure Machinery Equipment Co., Ltd., Jinan (CN)

(72) Inventors: Changhe Cao, Jinan (CN); Shaoyan Liu, Jinan (CN)

(73) Assignee: Jinan Abure Machinery Equipment Co., Ltd., Jinan (CN)

( * ) Notice: Subject to any disclaimer, the term of this patent is extended or adjusted under 35 U.S.C. 154(b) by 267 days.

(21) Appl. No.: 18/703,146

(22) PCT Filed: Jul. 26, 2022

(86) PCT No.: PCT/CN2022/107792
§ 371 (c)(1),
(2) Date: Apr. 19, 2024

(87) PCT Pub. No.: WO2023/065751
PCT Pub. Date: Apr. 27, 2023

(65) Prior Publication Data

US 2025/0010325 A1 Jan. 9, 2025

(30) Foreign Application Priority Data

Oct. 21, 2021 (CN) ......................... 202111225612.7

(51) Int. Cl.
*B05B 15/52* (2018.01)
*B05B 7/04* (2006.01)

(52) U.S. Cl.
CPC ............ *B05B 15/52* (2018.02); *B05B 7/0416* (2013.01)

(58) Field of Classification Search
CPC ..... B05B 15/52; B05B 7/0416; B05B 7/0815; B05B 7/2497; B05B 7/02; B05B 15/50; B05B 7/2405; B05B 7/0408; B05B 7/1236
See application file for complete search history.

(56) References Cited

U.S. PATENT DOCUMENTS 3,687,370 A * 8/1972 Sperry .................... B29B 7/803
239/117
3,799,403 A * 3/1974 Probst .................. B05B 7/1272
239/414
(Continued)

FOREIGN PATENT DOCUMENTS

CN 102026734 A 4/2011
CN 108296041 A 7/2018
(Continued)

OTHER PUBLICATIONS

Supplemental Search Report issued on Nov. 12, 2024 for counterpart Chinese patent Application No. 202111225612.7.
(Continued)

*Primary Examiner* — Steven M Cernoch
(74) *Attorney, Agent, or Firm* — Hamilton, Brook, Smith & Reynolds, P.C.

(57) ABSTRACT

A method for preventing a spray gun from blocking and a multi-component spray gun for spraying a rapid solidification material. A front-end chamber (16) of the spray gun is provided with an air channel (16*b*) for discharge of a leaked rapid solidification material. When a trigger of the spray gun is pulled to spray the rapid solidification material, if the rapid solidification material leaks into the front-end chamber (16*b*) in an area of a portion at which a side seal (30) is in contact with a mixing chamber (18), the leaked rapid solidification material is to be blown out, along with passing compressed air, from the air channel (16*b*) to an outside of
(Continued)

the spray gun, and thus the leaked rapid solidification material does not accumulate in the front-end chamber (16) and react and solidify to block the spray gun, and a problem that the spray gun is blocked is solved.

11 Claims, 13 Drawing Sheets

(56) References Cited

U.S. PATENT DOCUMENTS

| | | | | |
|---|---|---|---|---|
| 9,174,362 | B2 * | 11/2015 | Monchamp | B29B 7/7605 |
| 9,433,955 | B2 * | 9/2016 | Haralson | B05B 7/2405 |
| 2007/0034716 | A1 | 2/2007 | Zittel et al. | |
| 2016/0082454 | A1 | 3/2016 | Vogt et al. | |

FOREIGN PATENT DOCUMENTS

| | | | |
|---|---|---|---|
| CN | 208494791 | U | 2/2019 |
| CN | 208742849 | U | 4/2019 |
| CN | 110076022 | A | 8/2019 |
| CN | 211800099 | U | 10/2020 |
| CN | 113731662 | A | 12/2021 |
| WO | 2023/065751 | A1 | 4/2023 |

OTHER PUBLICATIONS

International Search Report issued for International Application No. PCT/EP20022/107792, mailed Oct. 20, 2022.

* cited by examiner

METHOD FOR PREVENTING SPRAY GUN FROM BLOCKING AND MULTI-COMPONENT SPRAY GUN FOR SPRAYING RAPID SOLIDIFICATION MATERIAL

This application is the U.S. National Stage of International Application No. PCT/CN2022/107792, filed Jul. 26, 2022, which designates the U.S., published in Chinese, and claims priority under 35 U.S.C. § 119 or 365(c) to Chinese Application No. 202111225612.7,filed Oct. 21, 2021. The entire teachings of the above applications are incorporated herein by reference.

TECHNICAL FIELD

The present disclosure relates a method for preventing a spray gun from blocking and a multi-component spray gun for spraying a rapid solidification material, and is to solve a problem that an air cleaning type multi-component spray gun is blocked when spraying the rapid solidification material. Rapid solidification materials, such as polyurethane foams, polyureas, and the like, rapidly react after components thereof are mixed, typically in a few seconds.

BACKGROUND

In a prior art air cleaning type multi-component spray gun for spraying a rapid solidification material, the rapid solidification material often leaks into a front-end chamber of the spray gun in an area of a portion at which a side seal is in contact with a mixing chamber. When the leakage condition occurs at the time the trigger of the spray gun is pulled to spray the rapid solidification material, not only the leakage cannot be found, the leaked rapid solidification material accumulates in the front-end chamber and reacts and solidifies to block the front-end chamber, which causes that the spray gun cannot work, and serious leakage that the rapid solidification material enters the gun body from the front-end chamber can even occur, which causes that the front-end chamber and the gun body are blocked at the same time. Since the solidified material is very firm and takes a long time to be cleaned, improper cleaning may even cause the spray gun to be damaged and scrapped, which greatly affects a construction efficiency of the rapid solidification material.

SUMMARY

The multi-component spray gun for spraying a rapid-setting materials is commonly used for spraying similar materials such as polyurethane foam and polyurea. When these materials leak inside the spray gun, the curing reaction can fill the internal cavities and air passages of the gun, causing the components to bond firmly together. This makes disassembly prone to damage, resulting in time-consuming and labor-intensive repairs, and may even render the spray gun unusable. This phenomenon not only affects production efficiency but also poses a significant challenge to the user's work experience.

The fundamental cause of spray gun blockage lies in the leakage of multi-component fluids into the front chamber of the spray gun during distribution to the mixing chamber, which is caused by wear or failure of the sealing materials, leading to reaction and curing phenomena. Currently, industry technicians' research on spray gun blockage primarily focuses on improving sealing materials and structures to extend the operational lifespan of the spray gun. However, this approach merely reduces the frequency of blockages without fundamentally addressing the issue, indicating that the considerations are not comprehensive enough.

Although multi-component spray guns for spraying a rapid-setting materials have been used in the industry for over 20 years, technological innovation and research have lagged behind. There is also a certain degree of technical bias within the industry, as technicians have long believed that the gas directed into the front chamber of the spray gun must be expelled from the nozzle of the mixing chamber to ensure complete cleaning of the mixing chamber. If gas is expelled from other locations in the front chamber, it is perceived as a leakage issue, and any such leakage is regarded as a sign of a defective product. This entrenched mindset limits innovation in the industry, preventing many potential improvement solutions from being fully explored and implemented.

In order to achieve the purpose of preventing the air cleaning type multi-component spray gun from being blocked when spraying a rapid solidification material, the present disclosure provides a method for preventing a spray gun from blocking and a multi-component spray gun for spraying a rapid solidification material.

A method for preventing a spray gun from blocking according to a first aspect of the present disclosure, in which a front-end chamber of the spray gun is provided with an air channel for discharge of a leaked rapid solidification material, the air channel being configured to guide compressed air entering the front-end chamber to be blown out to an outside of the spray gun through an area of a portion at which a side seal is in contact with a mixing chamber, and when a trigger of the spray gun is pulled to spray the rapid solidification material, if the rapid solidification material leaks into the front-end chamber in the area of the portion at which the side seal is in contact with the mixing chamber, the leaked rapid solidification material is to be blown out of the spray gun from the air channel, along with the passing compressed air, and thus the leaked rapid solidification material does not accumulate in the front-end chamber to react and solidify to block the spray gun.

A direction of the air blown out from the air channel to the outside of the spray gun and a direction in which the rapid solidification material is sprayed from the mixing chamber are different; No matter how much air is blown out of the air channel, it does not affect the pattern of rapid solidification material ejected from the mixing chamber.

Whether the rapid solidification material leaks into the front-end chamber is determined by observing whether the air blown out from the air channel contains the rapid solidification material. When the air blown out from the air channel is clean air, it is indicated that no rapid solidification material leaks into the front-end chamber, and when the air blown out from the air channel contains the rapid solidification material, it is indicated that the rapid solidification material leaks into the front-end chamber.

It can be roughly determined whether there is a small leakage or a serious leakage according to an amount of the rapid solidification material contained in the air blown out from the air channel. For the situation in which a small amount of the rapid solidification material leaks into the front-end chamber, since the leaked rapid solidification material is continuously blown out from the air channel and does not accumulate in the front-end chamber and react and solidify to block the spray gun, the spray gun can be maintained without being stopped, the spraying can be continued, the spray gun can be maintained after work, and a lot of working time is saved, which is impossible with spray guns in the prior art. For the situation in which a large amount of the rapid solidification material leaks into the front-end chamber, since the leaked rapid solidification material is continuously blown out from the air channel and does not accumulate in the front-end chamber of the spray gun and react and solidify to block the spray, the spray gun can be quickly disassembled to replace consumables. This changes a method in the prior art of spending a lot of time and considerable labor intensity to maintain the spray gun only if the spray gun is blocked. The present disclosure allows the working status of the spray gun to be visualized, and completely solves the most troublesome blocking problem of the multi-component spray gun that sprays a rapid solidification material, which greatly improves an efficiency of application of the rapid solidification material and reduces a risk that the spray gun is damaged.

A multi-component spray gun for spraying a rapid solidification material according to a second aspect of the present disclosure, in which a front-end chamber of the spray gun of the present disclosure uses the method for preventing the spray gun from blocking of the present disclosure and is provided with an air channel for discharge of a leaked rapid solidification material, and the air channel guides compressed air entering the front-end chamber to be blown out to an outside of the spray gun from an area of a portion at which a side seal is in contact with a mixing chamber.

A leakage discharge valve is positioned in the front-end chamber, and an amount of the air blown out from a leakage discharge nozzle is adjustable by rotating the leakage discharge valve. A direction of the air blown out from the leakage discharge nozzle to the outside of the spray gun and a direction in which the rapid solidification material is sprayed from the mixing chamber are different, and an amount of air blown out from the leakage discharge nozzle does not affect a pattern of the rapid solidification material ejected from the mixing chamber.

A grease fitting is positioned on the gun body, and a plurality of air channels positioned in the gun body are connected with the grease fitting, an air piston, a trigger piston, and the front-end chamber. Grease is filled through the grease fitting without disassembling the spray gun, and can be blown into the gun body and a cavity of the front-end chamber along the plurality of air channels by the compressed air, so that an O-shaped ring and a metal part in the cavity are lubricated, abrasion is reduced, and the working time of the spray gun is prolonged as much as possible. The maintenance and lubrication of the spray gun is completed without disassembling the spray gun, thereby avoiding the problem of crystallization and solidification occurring when a component of the rapid solidification material, for example, a resin or isocyanate, is exposed to air.

Side seal boxes, filter check valves, and intercept valves are all provided with threads, and are fixed in an A shell and a B shell by screwing, the side seal boxes, the filter check valves, and the intercept valves each have the O-shaped ring to match with the A shell and the B shell for sealing, and a mounting position of the O-shaped ring is closer to a fluid than the threads, so that the fluid is not in contact with the threads of positions at which the side seal boxes, the filter check valves, and the intercept valves are fixed with the A shell and the B shell. Therefore, a condition that the threads are disassembled and damaged by using considerable labor intensity after the resin or isocyanate component is crystallized at the threads, which causes the threads to stick, does not occur.

The side seal box includes an outer shell and a side seal, an inner hole of the outer shell is a through hole, and a diameter at any position of the inner hole is larger than a maximum diameter of the side seal. When the O-shaped ring on the side seal needs to be replaced, a tool may be used to contact a non-seal surface of the side seal to pull the side seal to the other end of the outer shell, and is not in contact with and damage a seal surface of the side seal. Thus, the spray gun of the present disclosure is not like the spray gun in the prior art in which the side seal can be removed only from one end of the outer shell and the tool used is to contact the seal surface of the side seal. Since the seal surface of the side seal is similar to a very smooth mirror surface, the tool used easily breaks the seal surface of the side seal, and once the seal surface of the side seal is broken, not only the seal surface of the mixing chamber, which is also a very smooth mirror surface, in contact with the side seal can be damaged, but also the rapid solidification material can be caused to leak into the spray gun, causing a great potential for the blockage of the spray gun.

These and other objects of the present disclosure will be more fully apparent from the following description taken in conjunction with the accompanying drawings. Like reference numerals refer to like or similar parts throughout the several figures.

DETAILED DESCRIPTION OF EMBODIMENTS

Figure 1:
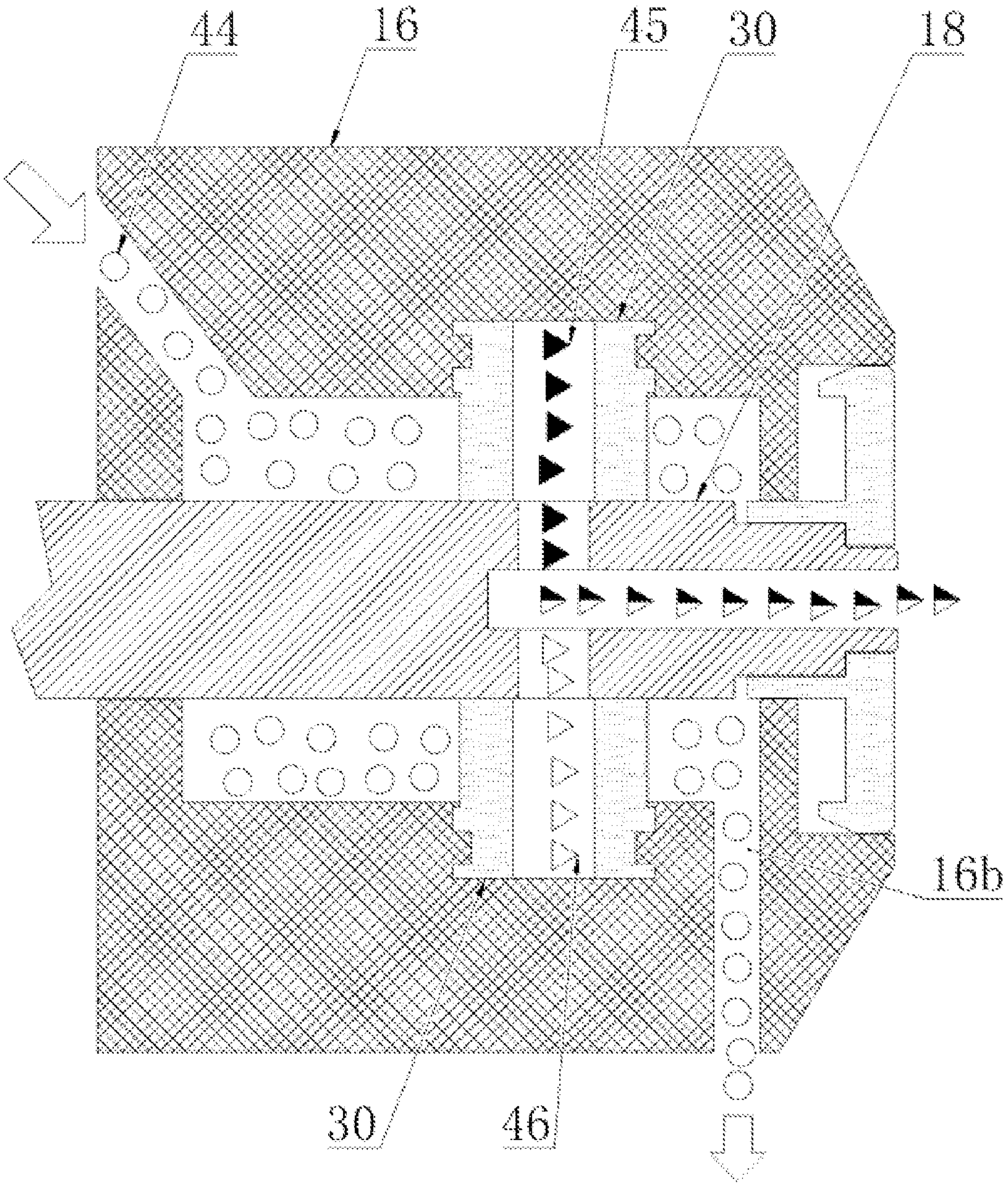
FIG. 1 is a schematic diagram of a working principle of a method for preventing a spray gun from blocking of the present disclosure when no rapid solidification material leaks into a front-end chamber.
Figure 2:
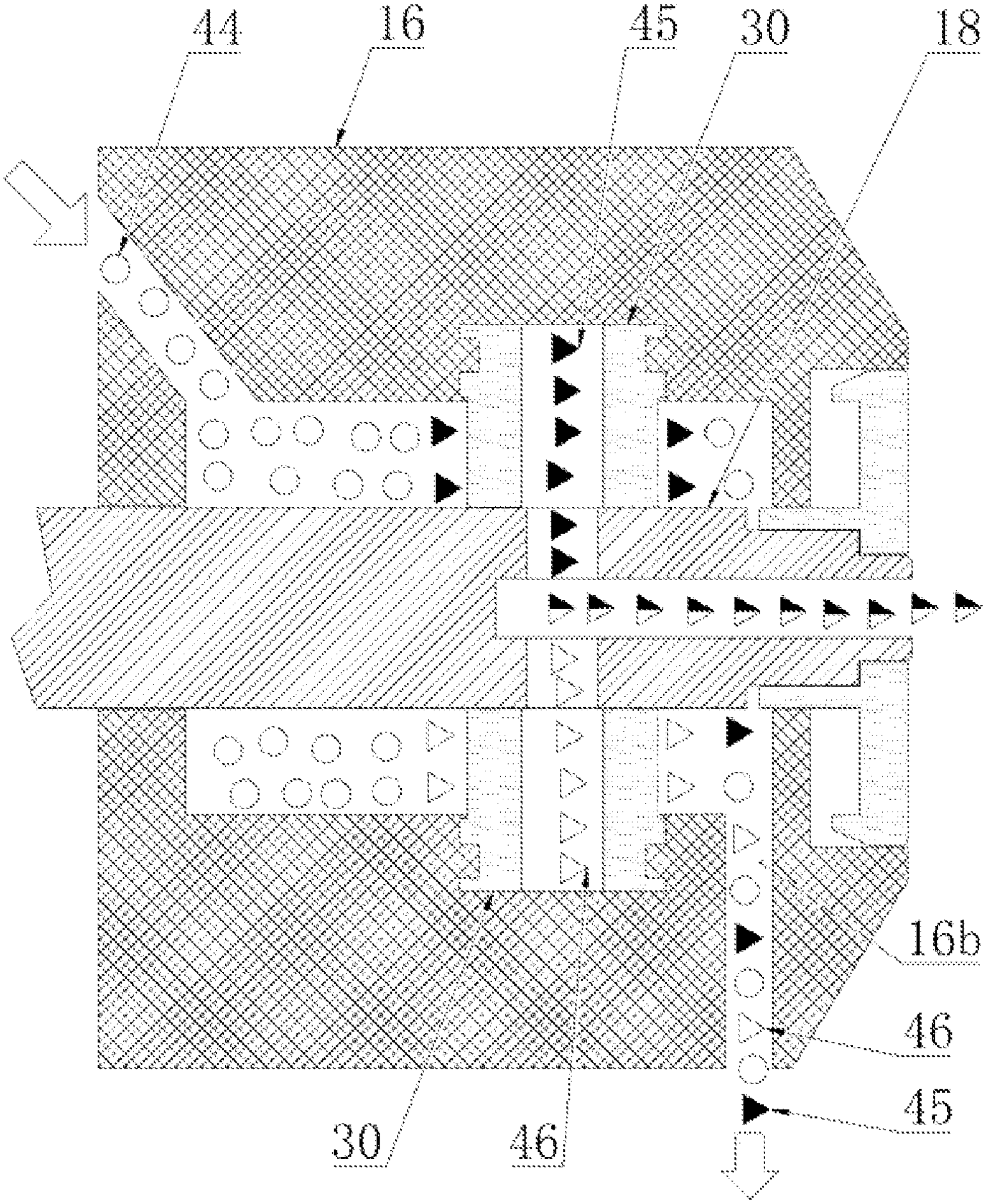
FIG. 2 is a schematic diagram of a working principle of the method for preventing a spray gun from blocking of the present disclosure when the rapid solidification material leaks into the front-end chamber.

A method for preventing a spray gun from blocking of the present disclosure is fully shown in FIGS. 1 and 2. A front-end chamber 16 of the spray gun is provided with an air channel 16*b* for discharge of a leaked rapid solidification material, and the air channel 16*b* guides compressed air 44 (enter through the air inlet passage) entering the front-end chamber 16 to be blown out to an outside of the spray gun from an area of a portion at which a side seal 30 is in contact with a mixing chamber 18. A direction of the air blown out from the air channel 16*b* to the outside of the spray gun and a direction in which the rapid solidification material is sprayed from the mixing chamber 18 are different, and an amount of the air blown out from the air channel 16*b* does not affect a pattern of the rapid solidification material ejected from the mixing chamber 18.

As shown in FIG. 1, when a trigger of the spray gun is pulled to spray the rapid solidification material, during transport of a multi-component fluid 45 and a fluid 46 of the rapid solidification material from the side seal 30 to the mixing chamber 18, the rapid solidification material does not leak into the front-end chamber 16 in an area of a portion at which the side seal is in contact with the mixing chamber 18. The compressed air 44 entering the front-end chamber 16 passes through the area of the portion at which the side seal 30 is in contact with the mixing chamber 18, and blows the clean air 44 out from the air channel 16*b*.

As shown in FIG. 2, when the trigger of the spray gun is pulled to spray the rapid solidification material, during the transport of the multi-component fluid 45 (pass through the first fluid inlet passage) and the fluid 46 (pass through the second fluid inlet passage) of the rapid solidification material from the side seal 30 to the mixing chamber 18, the rapid solidification material leaks into the front-end chamber 16 in the area of the portion at which the side seal 30 is in contact with the mixing chamber 18. The compressed air 44 entering the front-end chamber 16 passes through the area of the portion at which the side seal 30 is in contact with the mixing chamber 18, and blows the air 44, the multi-component fluid 45, and the fluid 46 out from the air channel 16b, so that the multi-component fluid 45 and the fluid 46 do not accumulate in the front-end chamber 16 and react and solidify to block the spray gun.

A multi-component spray gun for spraying a rapid solidification material of the present disclosure is fully illustrated in FIGS. 3, 4, 5, 6, 7, 8, 9, 10, 11, 12, 13, 14, and 15.

Figure 5:
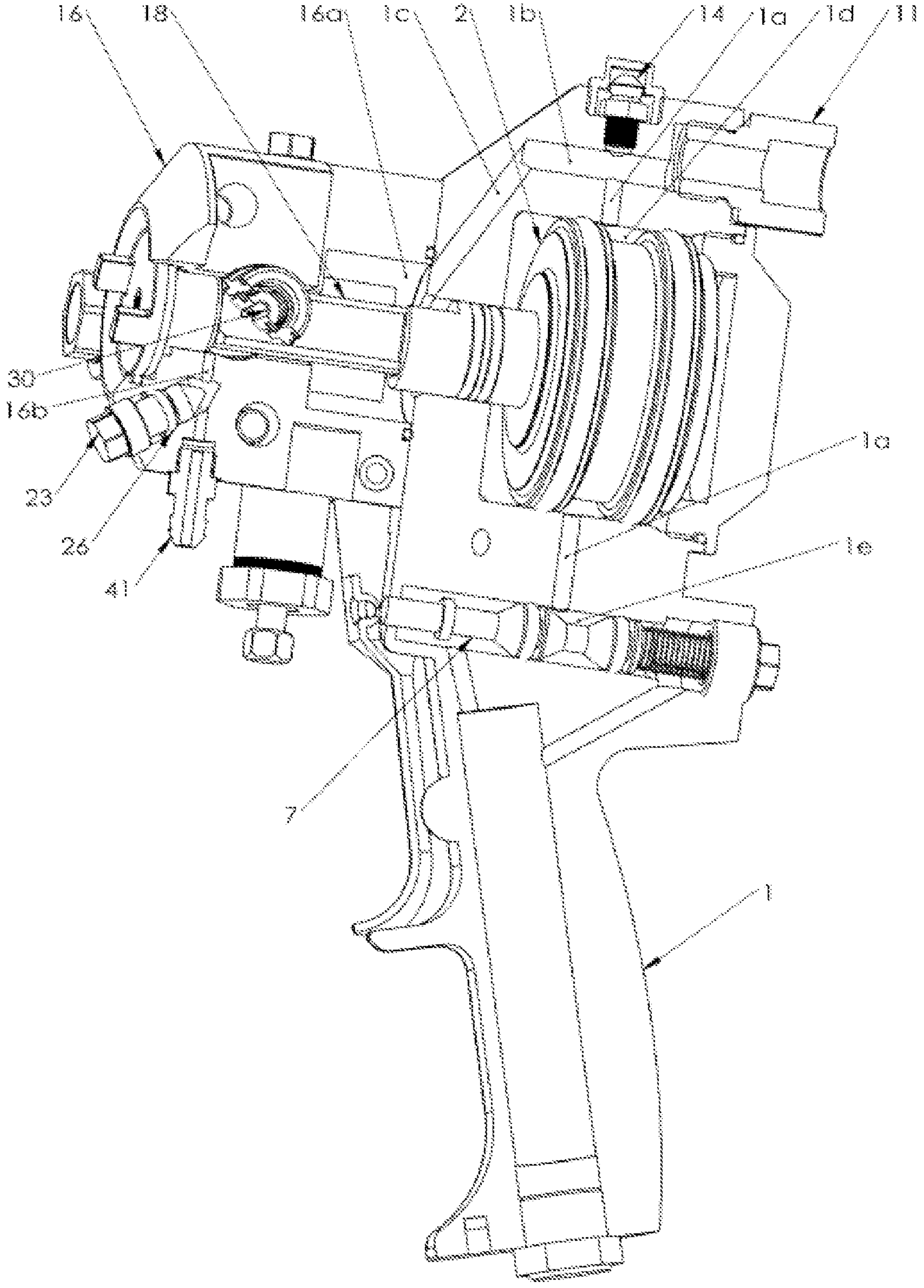
FIG. 5 is a partial cross-sectional view of the spray gun of the present disclosure.

As shown in FIG. 5, the front-end chamber 16 of the spray gun of the present disclosure uses the method for preventing a spray gun from blocking of the present disclosure. The front-end chamber 16 is provided with the air channel 16*b* for the discharge of the leaked rapid solidification material, and the air channel 16*b* guides the compressed air entering the front-end chamber 16 to be blown out to the outside of the spray gun from the area of the portion at which the side seal 30 is in contact with the mixing chamber 18.

As shown in FIG. 5, a leakage discharge valve 23 is mounted in the front-end chamber 16, and matches with the front-end chamber 16 for sealing by one O-shaped ring 26. A leakage discharge nozzle 41 is fixed to the air channel 16*b* of the front-end chamber 16, a tapered surface on a top portion of the leakage discharge valve 23 can completely seal the air channel 16, and an amount of air blown out from the leakage discharge nozzle 41 is adjustable by rotating the leakage discharge valve 23. A direction of the air blown out from the leakage discharge nozzle 41 to the outside of the spray gun and a direction in which the rapid solidification material is sprayed from the mixing chamber 18 are different, and the amount of the air blown out from the leakage discharge nozzle 41 does not affect a pattern of the rapid solidification material ejected from the mixing chamber 18.

As shown in FIG. 5, the spray gun is connected to a compressed air source through an air interface 11, a grease fitting 14 is positioned on the gun body 1, and a plurality of air channels 1*a*, 1*b*, and 1*c* positioned in the gun body 1 are connected with the grease fitting 14, an air piston 2, a trigger piston 7, and the front-end chamber 16. Grease is filled through the grease fitting 14 without disassembling the spray gun, and may enter cavities 1*d* and 1*e* of the gun body 1 along the air channel 1*a* in the gun body 1 with the compressed air, and enter the cavity 16*a* of the front-end chamber 16 along the air channels 1*b* and 1*c* for lubricating the O-shaped ring and the metal part in the cavities and prolonging working time of the spray gun as much as possible. The maintenance and lubrication of the spray gun is completed without disassembling the spray gun, thereby avoiding the problem of crystallization and solidification occurring when a component of the rapid solidification material, for example, a resin or isocyanate, is exposed to air.

Figure 6:
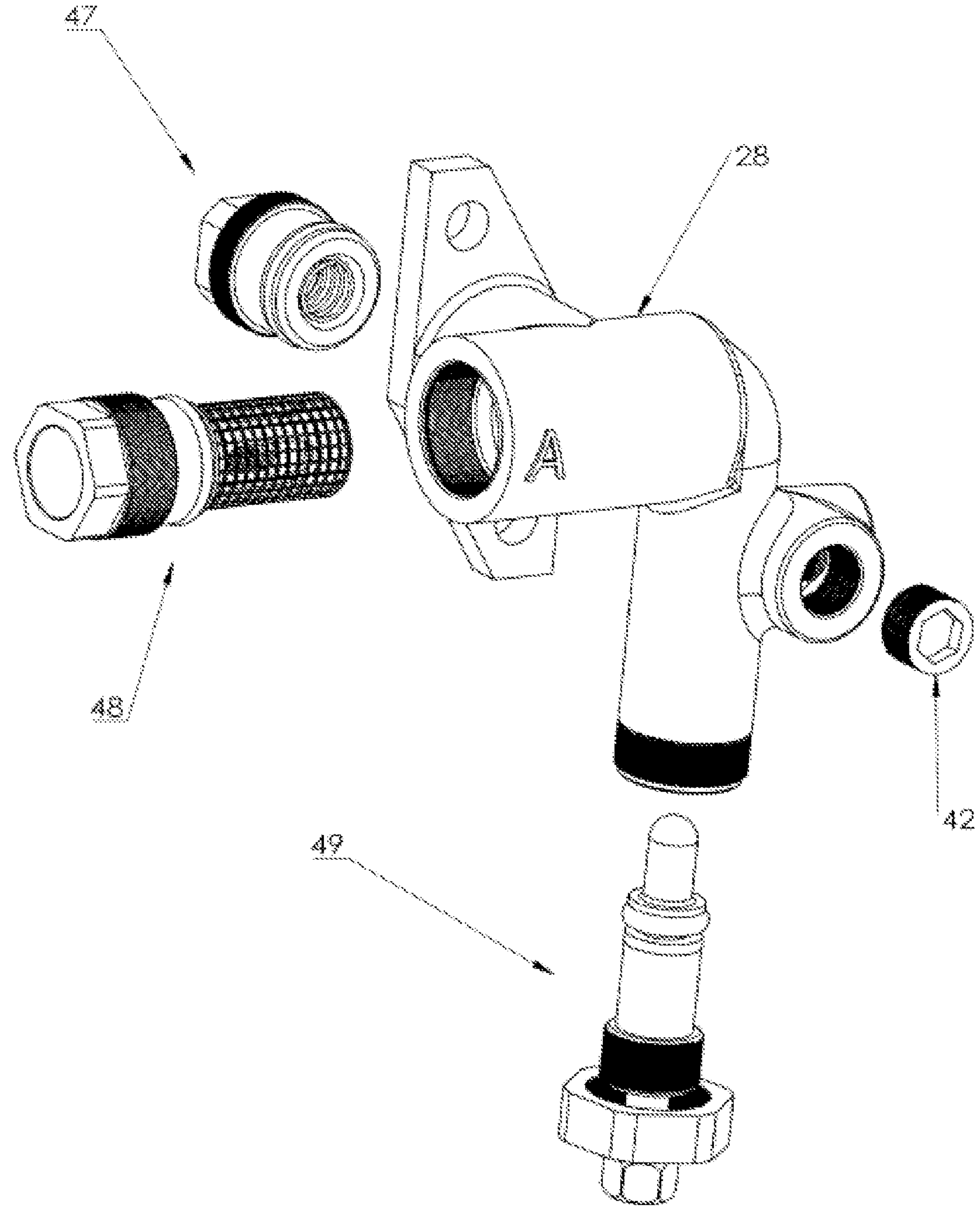
FIG. 6 is an exploded view of an A side block of the spray gun of the present disclosure.

As shown in FIG. 6, the A side block includes an A shell 28, a side seal box 47, a filter check valve 48, a intercept valve 49, and a screw 42.

Figure 7:
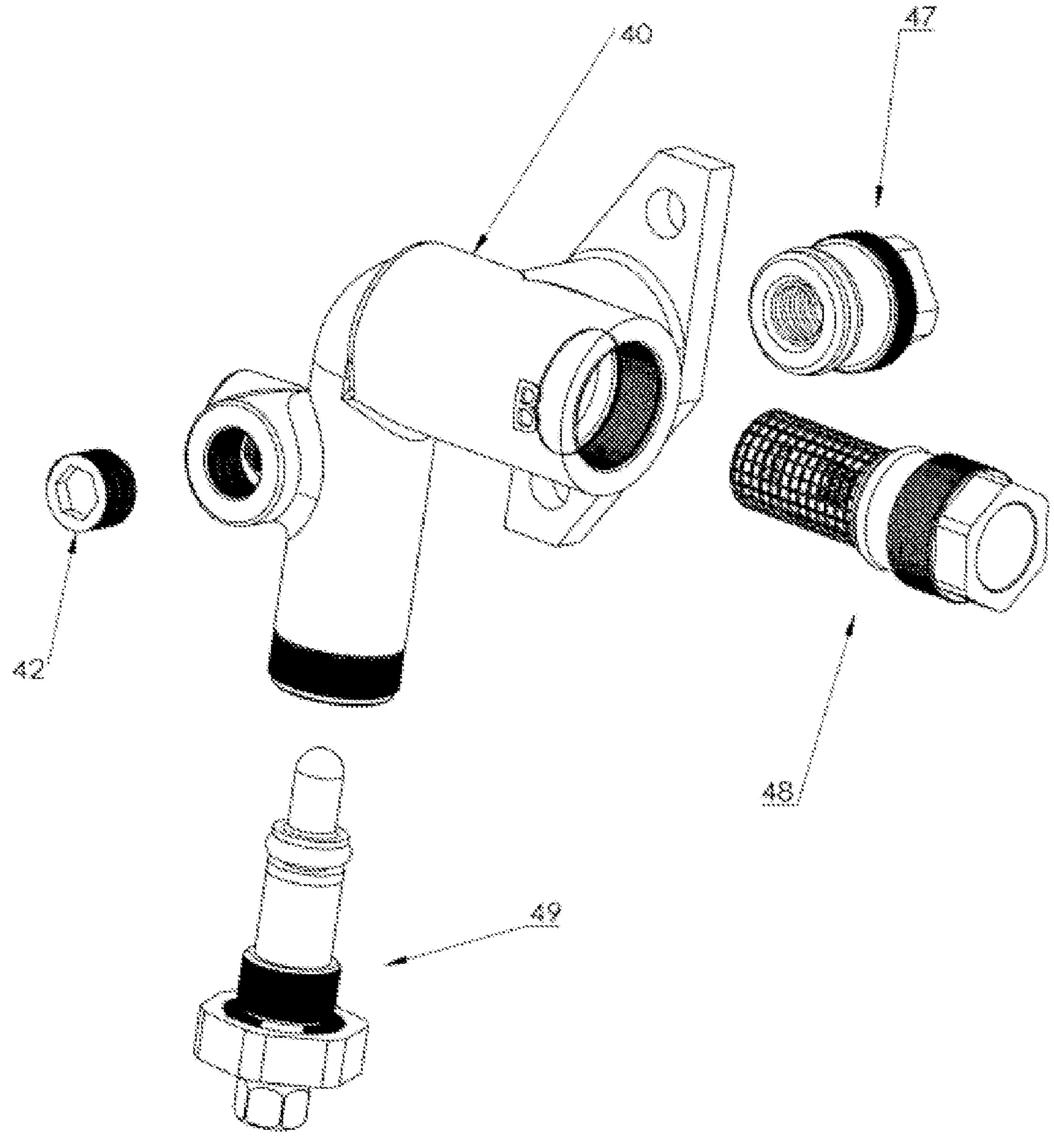
FIG. 7 is an exploded view of a B side block of the spray gun of the present disclosure.

As shown in FIG. 7, the B side block includes a B shell 40, the side seal box 47, the filter check valve 48, the intercept valve 49, and the screw 42.

Figure 3:
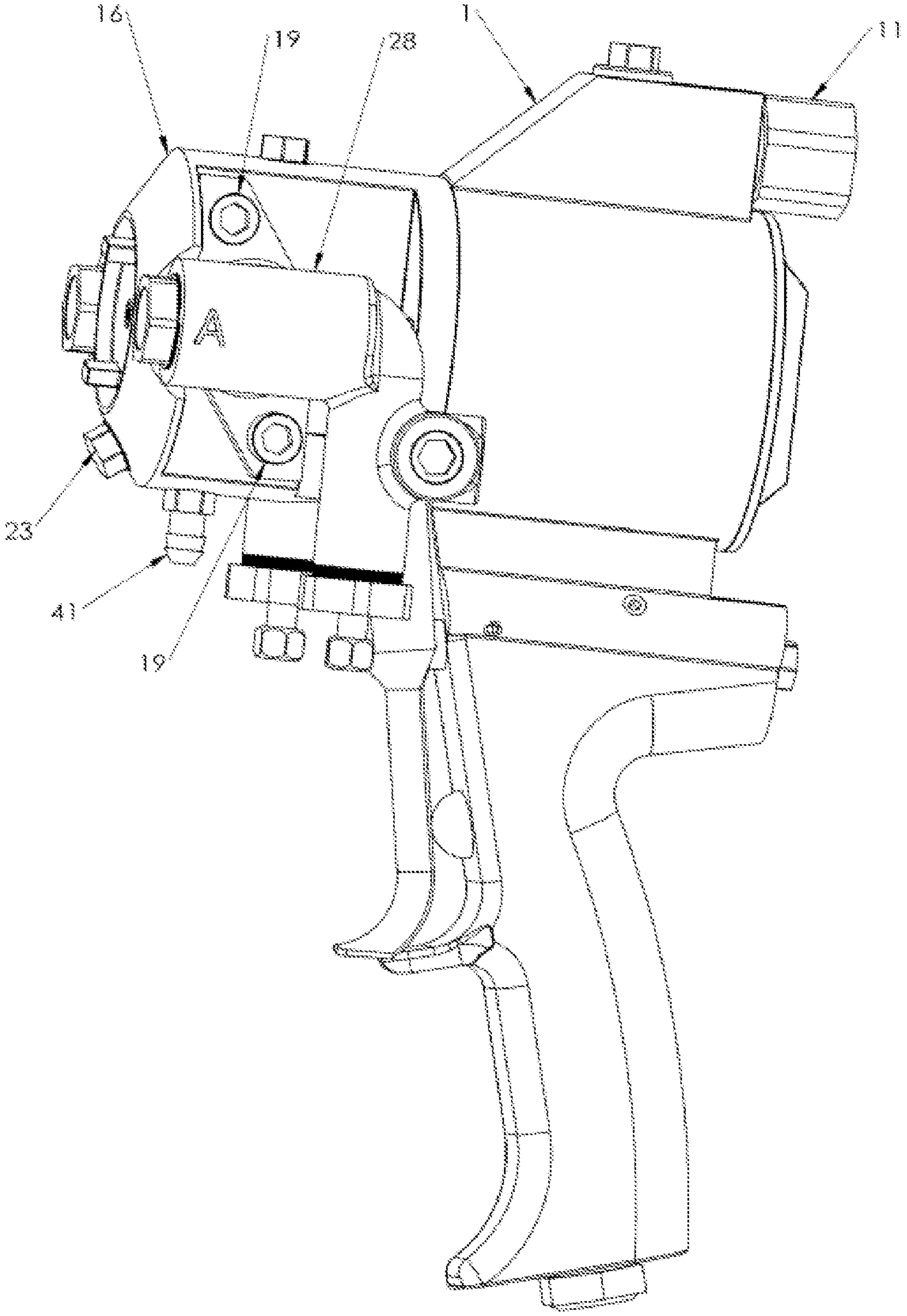
FIG. 3 is a perspective view of the spray gun of the present disclosure on one side.
Figure 4:
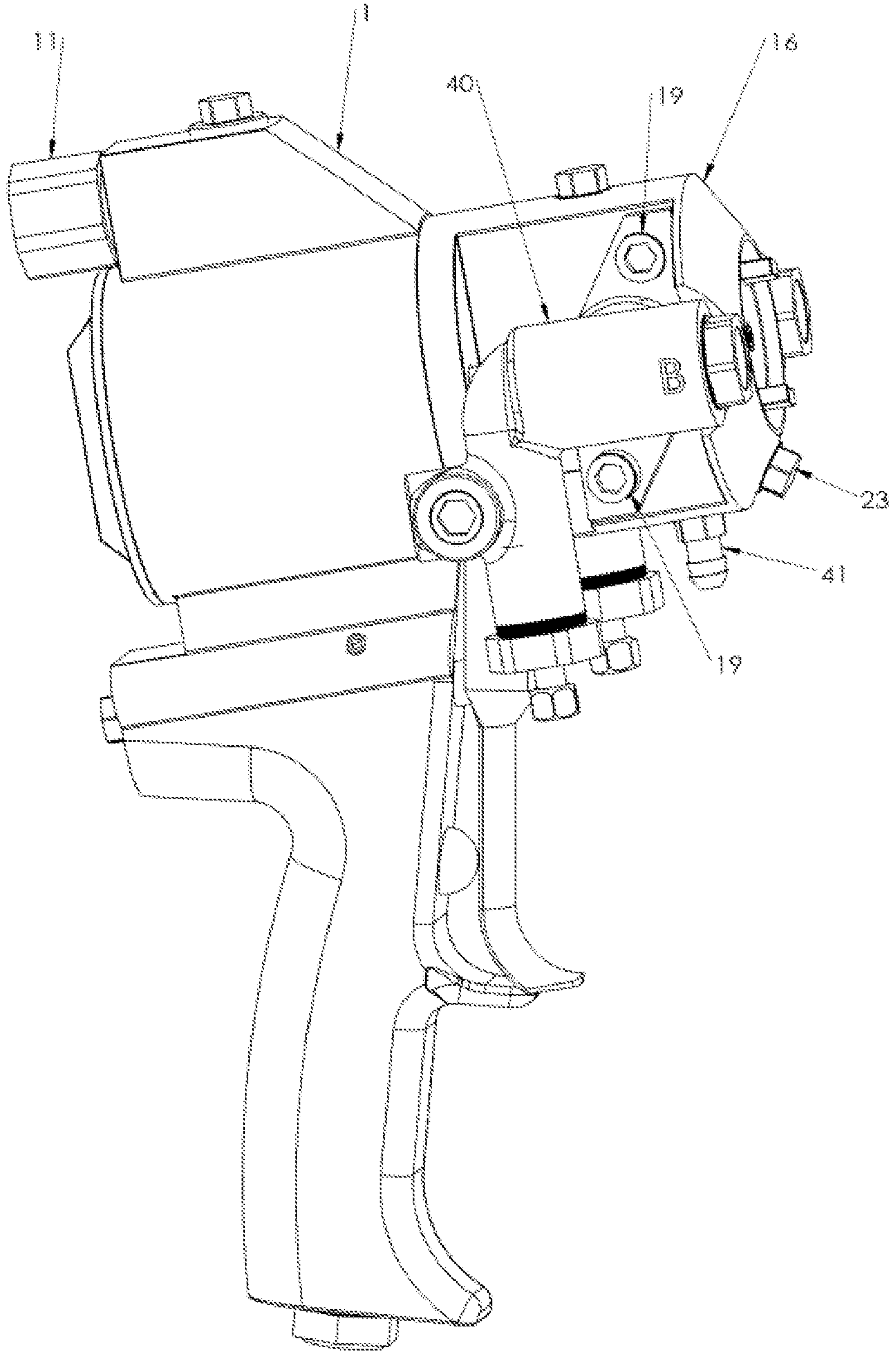
FIG. 4 is a perspective view of the spray gun of the present disclosure on another side.

As shown in FIGS. 3 and 4, the A side block and the B side block are respectively fixed to two sides of the front-end chamber 16 by two screws 19.

Figure 10:
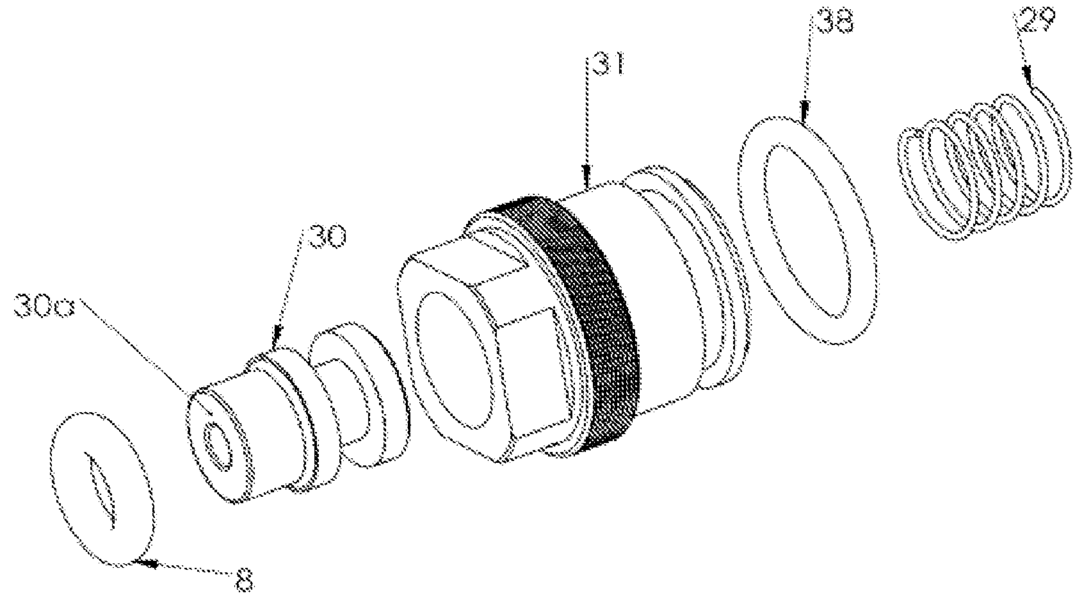
FIG. 10 is a first exploded view of a side seal box of the spray gun of the present disclosure.

As shown in FIG. 10, the side seal box 47 is formed of an outer shell 31, the side seal 30, a spring 29, and O-shaped rings 8 and 38.

Figure 13:
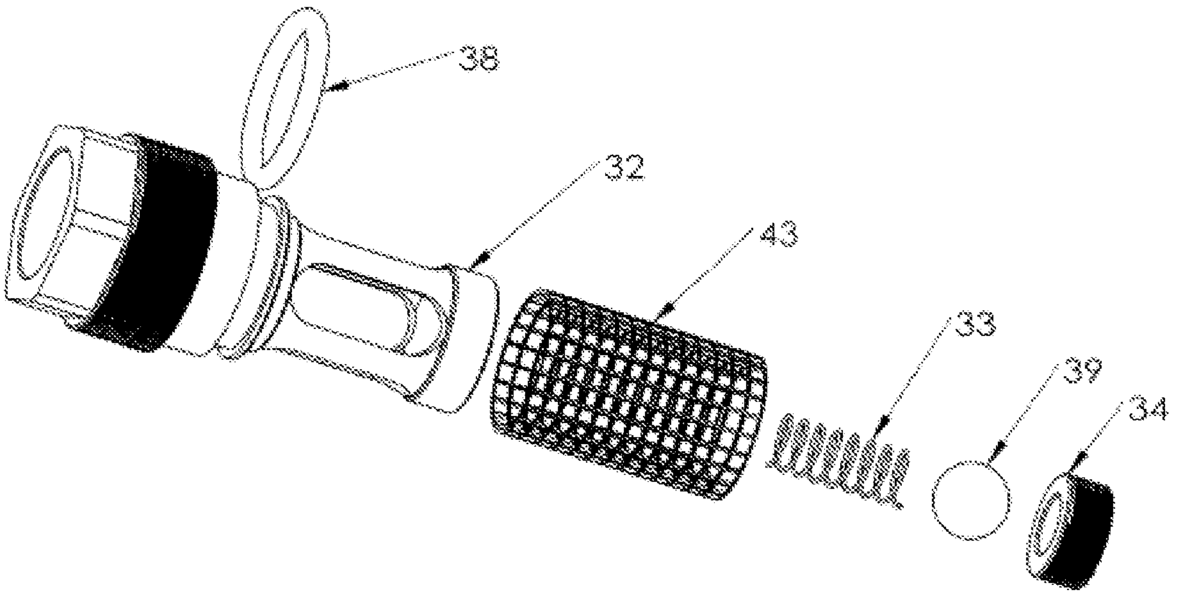
FIG. 13 is an exploded view of a filter check valve of the spray gun of the present disclosure.

As shown in FIG. 13, the filter check valve 48 is formed of a main body 32, the O-shaped ring 38, a filter screen 43, a spring 33, a steel ball 39, and a valve seat 34.

Figure 14:
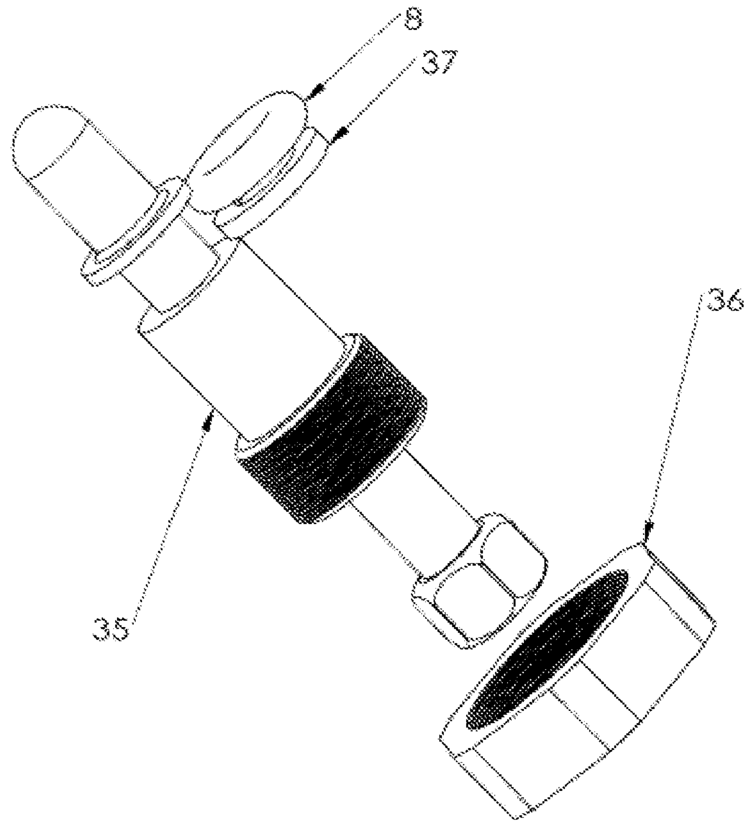
FIG. 14 is an exploded view of an intercept valve of the spray gun of the present disclosure.
Figure 15:
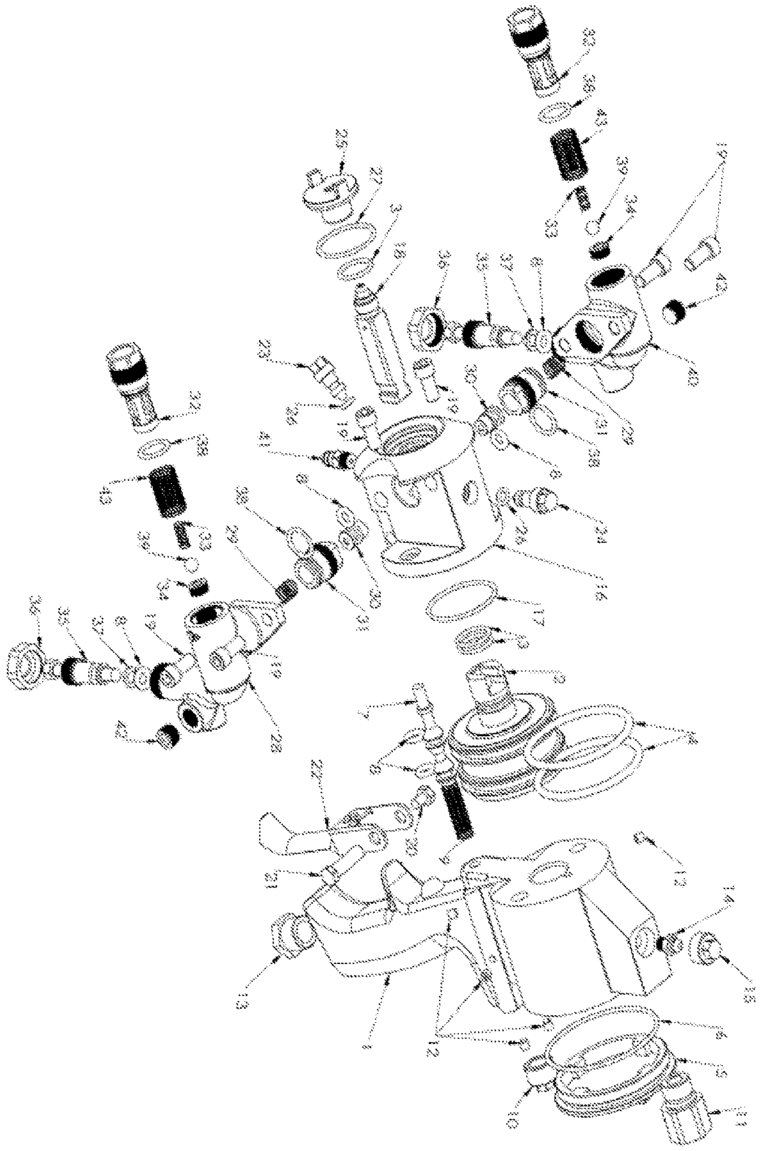
FIG. 15 is an exploded view of the spray gun of the present disclosure.

As shown in FIG. 14, the intercept valve 49 is formed of a valve stem 35, a nut 36, the O-shaped ring 8, and a spacer 37.

Figure 8:
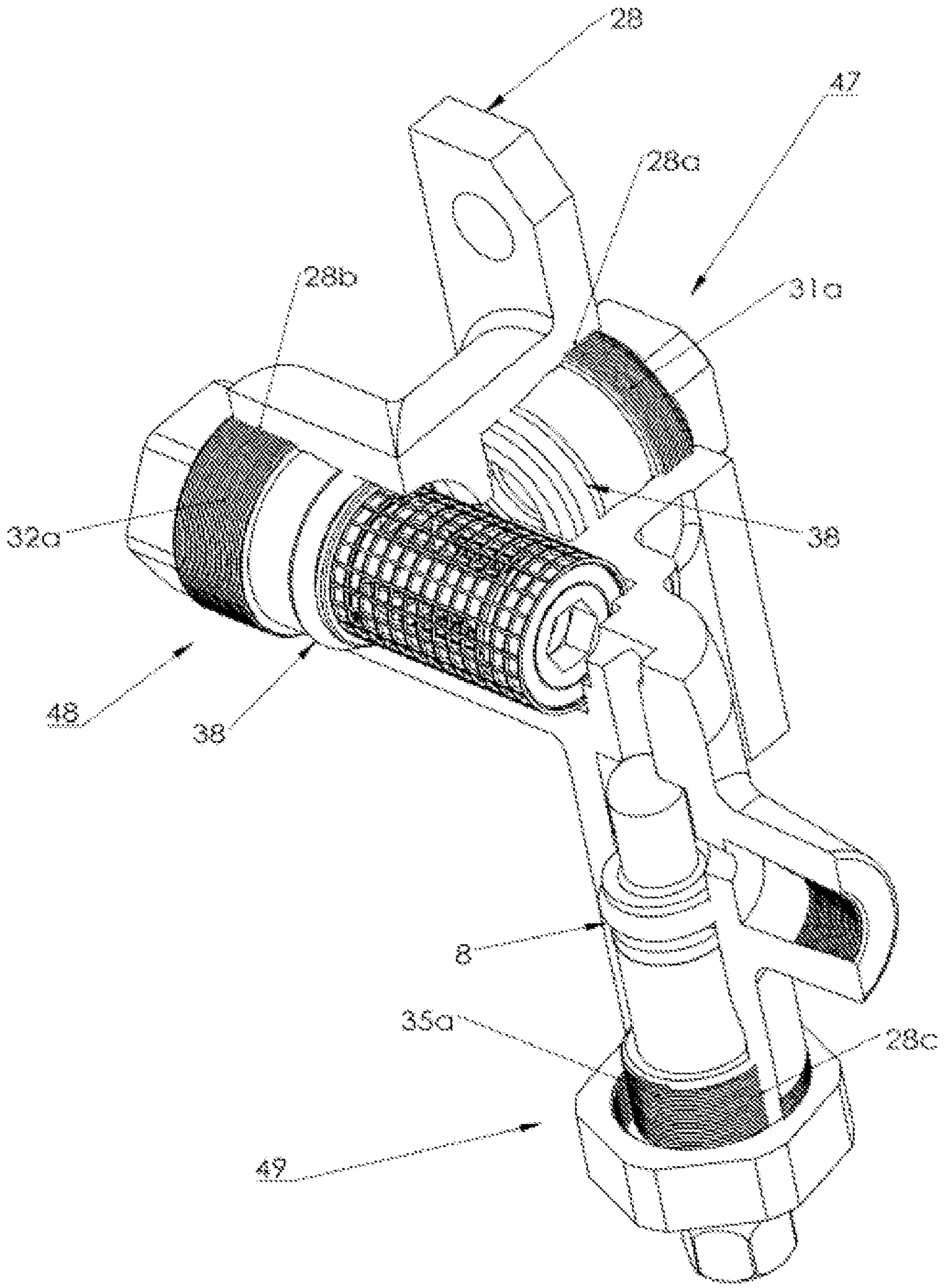
FIG. 8 is a partial cross-sectional view of the A side block of the spray gun of the present disclosure.

As shown in FIG. 8, the side seal box 47, the filter check valve 48, and the intercept valve 49 are fixed on the A shell 28 by threads. The O-shaped ring 38 on the side seal box 47 matches with the A shell 28 for sealing, and a mounting position of the O-shaped ring 38 on the side seal box 47 is closer to the fluid than a thread 31*a* on the side seal box 47, so that the fluid is not in contact with the thread 3la on the side seal box 47 and a thread 28*a* on the A shell 28. The O-shaped ring 38 on the filter check valve 48 matches with the A shell 28 for sealing, and a mounting position of the O-shaped ring 38 on the filter check valve 48 is closer to the fluid than a thread 32*a* on the filter check valve 48, so that the fluid is not in contact with the thread 32*a* on the filter check valve 48 and a thread 28*b* on the A shell 28. The O-shaped ring 8 on the intercept valve 49 matches with the A shell 28 for sealing, and a mounting position of the O-shaped ring 8 on the intercept valve 49 is closer to the fluid than a thread 35*a* on the intercept valve 49, so that the fluid is not in contact with the thread 35*a* on the intercept valve 49 and a thread 28*c* on the A shell 28. Therefore, a condition that the threads are disassembled and damaged by using considerable labor intensity after the resin or isocyanate component is crystallized at the threads, which causes the threads to stick, does not occur.

Figure 9:
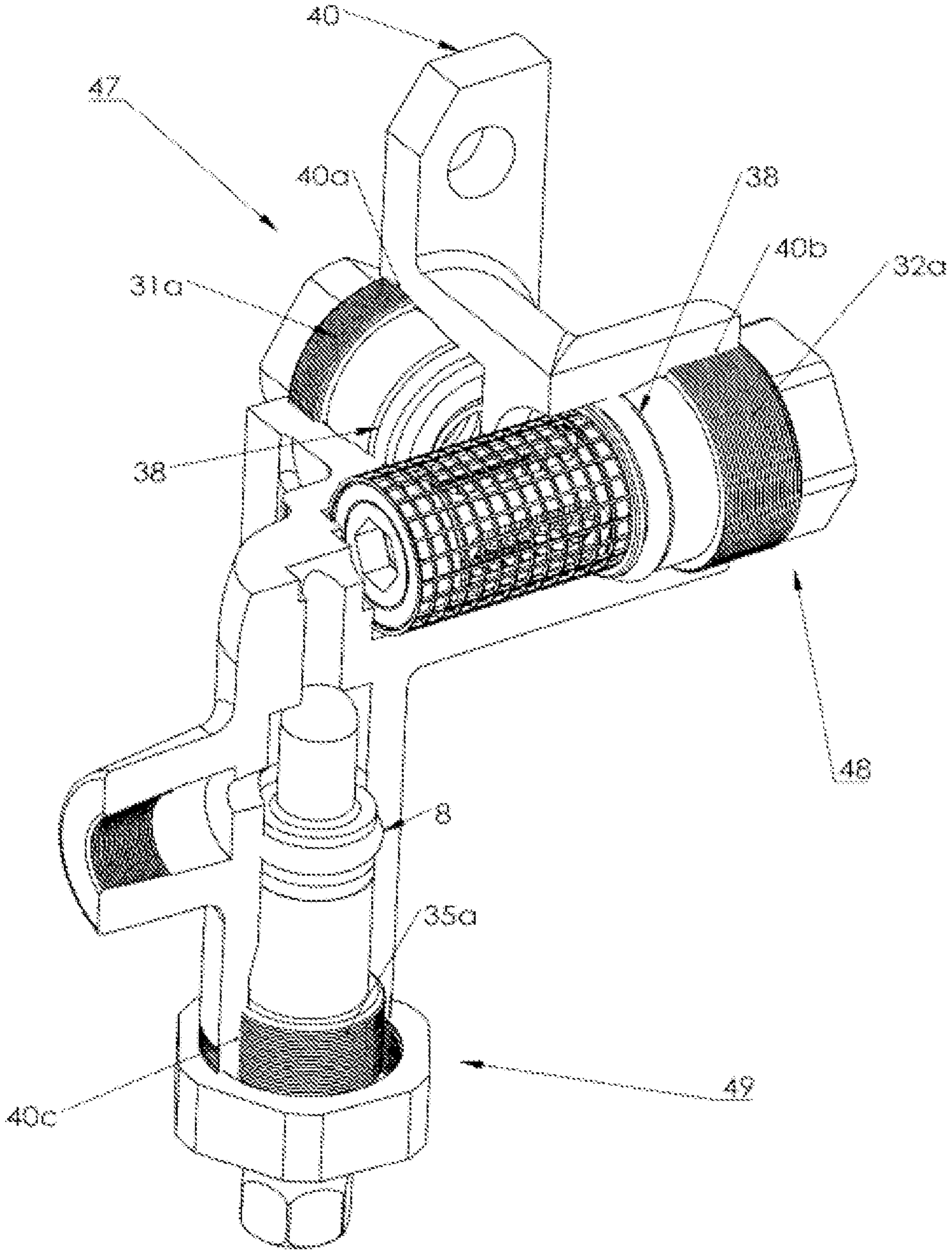
FIG. 9 is a partial cross-sectional view of the B side block of the spray gun of the present disclosure.

As shown in FIG. 9, the side seal box 47, the filter check valve 48, and the intercept valve 49 are fixed on the B shell 40 by threads. The O-shaped ring 38 on the side seal box 47 matches with the B shell 40 for sealing, and the mounting position of the O-shaped ring 38 on the side seal box 47 is closer to the fluid than the thread 31*a* on the side seal box 47, so that the fluid is not in contact with the thread 31*a* on the side seal box 47 and a thread 40*a* on the B shell 40. The O-shaped ring 38 on the filter check valve 48 matches with the B shell 40 for sealing, and the mounting position of the O-shaped ring 38 on the filter check valve 48 is closer to the fluid than the thread 32*a* on the filter check valve 48, so that the fluid is not in contact with the thread 32*an* On the filter check valve 48 and a thread 40*b* on the B shell 40. The O-shaped ring 8 on the intercept valve 49 matches with the B shell 40 for sealing, and the mounting position of the O-shaped ring 8 on the intercept valve 49 is closer to the fluid than the thread 35*a* on the intercept valve 49, so that the fluid is not in contact with the thread 35*an* On the intercept valve 49 and a thread 40*c* on the B shell 40. Therefore, the condition that the threads are disassembled and damaged by using considerable labor intensity after the resin or isocyanate component is crystallized at the threads, which causes the threads to stick, does not occur.

Figure 11:
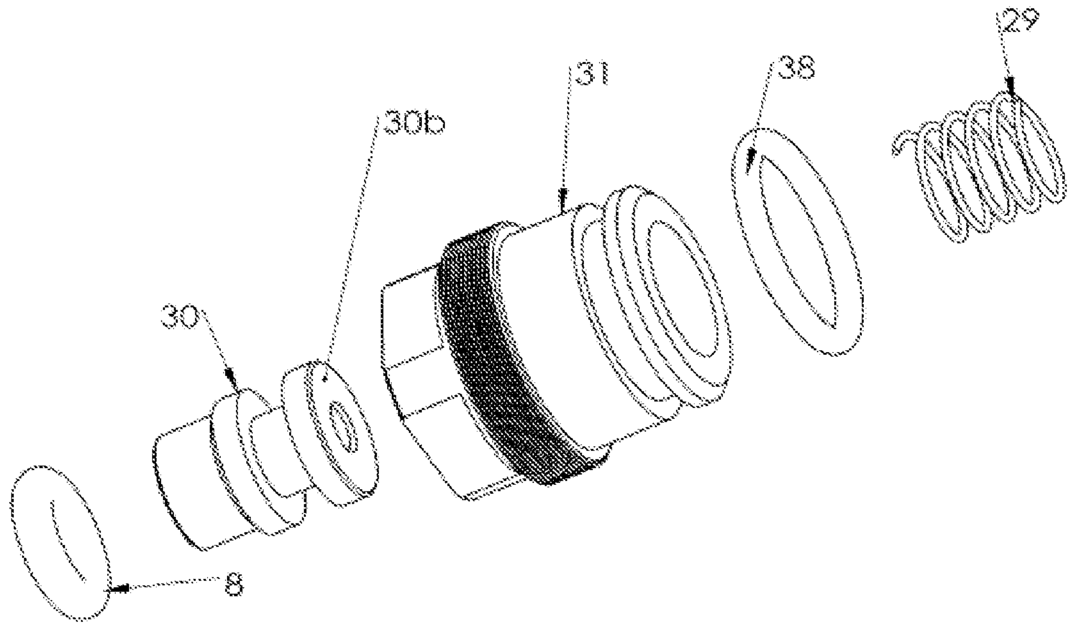
FIG. 11 is a second exploded view of the side seal box of the spray gun of the present disclosure.
Figure 12:
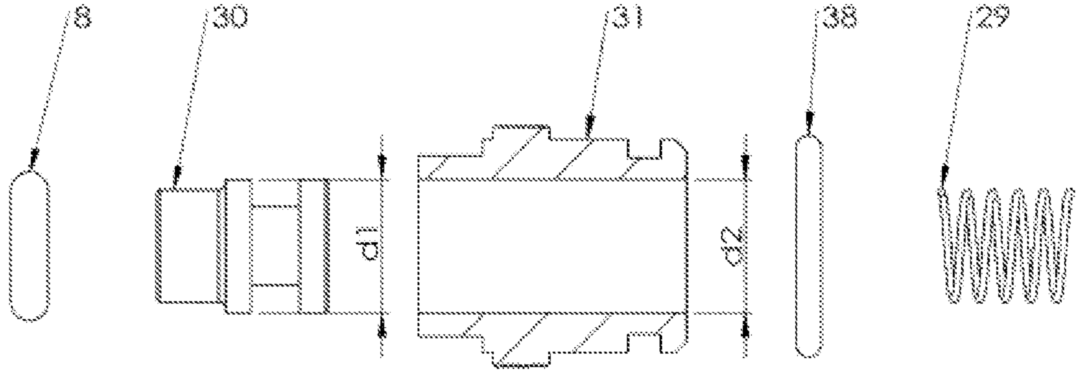
FIG. 12 is a partial cross-sectional view and exploded view of the side seal box of the spray gun of the present disclosure.

As shown in FIGS. 10, 11, and 12, an inner hole of the outer shell 31 of the side seal box 47 is a through hole, and a diameter d2 at any position of the inner hole is larger than a maximum diameter d1 of the side seal 30. When the O-shaped ring 8 on the side seal 30 needs to be replaced, a tool may be used to contact a non-seal surface 30*b* of the side seal 30 to pull the side seal 30 to the other end of the outer shell 31, and is not in contact with and damage a seal surface 30*a* of the side seal 30.

Various changes and modifications may be made to the method without departing from the spirit and scope defined by the appended claims.

The invention claimed is:

1. A method for preventing a spray gun from blocking, wherein a front-end chamber of the spray gun is provided with an air channel for discharge of a leaked rapid solidification material, the air channel being configured to guide compressed air entering the front-end chamber to be blown out to an outside of the spray gun through an area of a portion at which a side seal is in contact with a mixing chamber, and when a trigger of the spray gun is pulled to spray the rapid solidification material, if the rapid solidification material leaks into the front-end chamber in the area of the portion at which the side seal is in contact with the mixing chamber, the leaked rapid solidification material is to be blown out of the spray gun from the air channel, along with the passing compressed air, and thus the leaked rapid solidification material does not accumulate in the front-end chamber to react and solidify to block the spray gun, wherein a direction of the air blown out from the air channel to the outside of the spray gun and a direction in which the rapid solidification material is sprayed from the mixing chamber are different, whether the rapid solidification material leaks into the front-end chamber is determined by observing whether the air blown out from the air channel contains the rapid solidification material, when the air blown out from the air channel is clean air, it is indicated that no rapid solidification material leaks into the front-end chamber, and when the air blown out from the air channel contains the rapid solidification material, it is indicated that the rapid solidification material leaks into the front-end chamber.

2. The spray gun according to claim 1, wherein further comprising:

a plurality of air channels positioned in the gun body, the plurality of air channels are connected with a grease fitting, an air piston, a trigger piston, and the front-end chamber.

3. A multi-component spray gun for spraying a rapid solidification material, the spray gun comprising:

a gun body; and a front-end chamber configured to use the method for preventing a spray gun from blocking according to claim 1.

4. The spray gun according to claim 3, wherein further comprising:

a leakage discharge nozzle positioned in the front-end chamber; and a leakage discharge valve positioned in the front-end chamber, an amount of air blown out from the leakage discharge nozzle is adjustable by rotating the leakage discharge valve, and a direction of the air blown out from the leakage discharge nozzle to the outside of the spray gun and a direction in which the rapid solidification material is sprayed from a mixing chamber are different.

5. The spray gun according to claim 3, wherein further comprising:

an A side block and a B side block fixed on both sides of the front-end chamber by screws respectively, the A side block comprises an A shell, a side seal box, a filter check valve, and a intercept valve; the B side block includes a B shell, a side seal box, a filter check valve, and a intercept valve; and the side seal boxes, the filter check valves, and the intercept valves are provided with threads and are fixed in the A shell and the B shell by screwing; the side seal boxes, the filter check valves, and the intercept valves each have a O-shaped ring to match with the A shell and the B shell for sealing, and a mounting position of the O-shaped ring is closer to a fluid than the threads, so that the fluid is not in contact with the threads of positions at which the side seal boxes, the filter check valves, and the intercept valves are fixed in the A shell and the B shell.

6. The spray gun according to claim 5, wherein the side seal box includes an outer shell and a side seal, an inner hole of the outer shell is a through hole, and a diameter at any position of the inner hole of the outer shell is larger than a maximum diameter of the side seal.

7. A multi-component spray gun for spraying a rapid-setting material, the multi-component spray gun comprising: a gun body and a front-end chamber, wherein:

the front-end chamber includes: an air inlet passage, an air channel, a mixing chamber, side seals, a first fluid inlet passage, and a second fluid inlet passage;

the air inlet passage is provided on the front-end chamber and communicates with the mixing chamber, allowing compressed air to enter the front-end chamber;

the air channel is provided on the front-end chamber and communicates with the mixing chamber, used for discharging air mixed with rapid-setting material;

a region at which the mixing chamber contacts the first fluid inlet passage and the second fluid inlet passage is a leakage point, which is located between the air inlet passage and the air channel, wherein the compressed air entering through the air inlet passage flows through the leakage point and is then discharged through the air channel; and the side seals are respectively provided on the first fluid inlet passage and the second fluid inlet passage to prevent fluid leakage, wherein a leakage discharge nozzle and a leakage discharge valve are provided at the outlet of the air channel set in the front-end chamber; the size of the air discharged through the leakage discharge nozzle can be adjusted by rotating the leakage discharge valve, wherein the direction of air discharged from the leakage discharge nozzle to the outside of the spray gun is different from the direction in which the mixing chamber sprays rapid-setting material outward.

8. The multi-component spray gun for spraying a rapid-setting material according to claim 7, further comprising side blocks fixed on both sides of the front-end chamber;

the side blocks include a housing, a side seal box, a filter check valve, and an intercept valve, wherein the side seal box, the filter check valve, and the intercept valve are fixed within the housing.

9. The multi-component spray gun for spraying a rapid-setting material according to claim 8, wherein the side seal box includes a shell and side seals, wherein an inner hole of the shell being a through hole, and a diameter of the inner hole at any position of the shell being greater than a maximum diameter of the side seals.

10. The multi-component spray gun for spraying a rapid-setting material according to claim 8, wherein the side seal box, the filter check valve, and the intercept valve are fixed in the housing by threads and each has an O-shaped ring for sealing with the housing.

11. The multi-component spray gun for spraying a rapid-setting material according to claim 10, wherein the mounting position of the O-shaped ring is closer to the fluid than the threads, ensuring that the fluid does not contact the threads fixed at the position of the side seal box, the filter check valve, and the intercept valve with the housing.

* * * * *